United States Patent [19]

Wang et al.

[11] 4,233,571

[45] Nov. 11, 1980

[54] LASER HAVING A NONLINEAR PHASE CONJUGATING REFLECTOR

[75] Inventors: Victor Wang, Oxnard Beach; Amnon Yariv, San Marino, both of Calif.

[73] Assignee: Hughes Aircraft Company, Culver City, Calif.

[21] Appl. No.: 945,986

[22] Filed: Sep. 27, 1978

[51] Int. Cl.³ ............................................. H01S 3/10
[52] U.S. Cl. ........................... 331/94.5 C; 331/94.5 T
[58] Field of Search ..................... 331/94.5 C, 94.5 N, 331/94.5 T

[56] References Cited

U.S. PATENT DOCUMENTS

| | | | |
|---|---|---|---|
| 3,617,927 | 11/1971 | Pohl | 331/94.5 Q |
| 3,731,103 | 5/1973 | O'Meara | 250/199 |
| 3,999,144 | 12/1976 | Bret | 331/94.5 N |
| 4,005,935 | 2/1977 | Wang | 356/5 |

OTHER PUBLICATIONS

Freeman et al., Adaptive Laser Resonator, Opt. Lett., vol. 2, No. 3, (Mar. 1978), pp. 61–63.

Zeldovich et al., Connection Between Wave Fronts of the Reflected and Excited Light in Stimulated Mandel'-shatm-Brillouin Scattering, Zhetf Pis. Red. 15, No. 3, (Feb. 5, 1972), pp. 160–164.

Nosach et al., Cancellation of Phase Distortion in the Amplifying Medium with a Brillouin Mirror, Zhetf Pis. Red. 16, No. 11, (Dec. 5, 1972), pp. 617–621.

*Primary Examiner*—William L. Sikes
*Attorney, Agent, or Firm*—Kenneth W. Float; W. H. MacAllister

[57] ABSTRACT

A laser which self-corrects for distortions introduced into the laser beam wavefronts by aberrations and time-varying phenomena internal to the laser. The improved laser includes a partially transmissive first reflecting element, an aperture stop, a lasing medium and a nonlinear phase conjugate reflecting device as the second reflecting element. During laser operation, aberrated wavefronts impinging upon the second reflecting element are reflected as the phase conjugate waveform thereof. The aperture stop restricts laser operation to the fundamental mode which allows only corrected, unaberrated waves to pass through the aperture stop and to subsequently exit the laser. Four embodiments are described utilizing stimulated Brillouin scattering (SBS), four-wave mixing, three-wave mixing and photon echo devices as the second reflecting element.

9 Claims, 7 Drawing Figures

LASER HAVING A NONLINEAR PHASE CONJUGATING REFLECTOR

BACKGROUND OF THE INVENTION

The present invention relates to lasers and, more particularly, to an improved laser which corrects for distortions in the wavefronts of the laser beam.

In an ideal laser resonator, with no aberrations in the lasing medium or distortions created by the reflecting means, only the fundamental resonating mode would be present. Since all the energy is contained in the single fundamental mode, no power would be lost, and optimum performance would be achieved.

However, there are problems associated with any laser device. Such problems include vibration of the reflecting surfaces, misalignment of the reflecting surfaces, heating of the reflecting surfaces thus causing warping, aberrations in the lasing medium, and turbulence in the lasing medium. These undesirable conditions result in lower system efficiency, and keep the system from performing at its diffraction limit, i.e., optimum focusing capability.

The optical components of the laser resonator govern the spatial coherency of the resultant laser beam and are determinative of optimum propagation and focusing capability. The above-mentioned undesirable conditions result in a reduction of the far-field intensity profile, and can require a reduction in the diameter of the mode-limiting aperture stop, thus reducing the extractable power.

Prior art solutions to these problems require a high degree of accuracy in the optical components used (typically fabrication accuracy to $\lambda/10$ or better), and mechanically stable oscillator cavities with low Fresnel numbers (typically $a^2/\lambda L \sim 1$). A mode-selecting aperture is conventionally used to select the lowest order transverse mode when optimum spatial coherence and beam propagation are desired. Accurate alignment of the focusing elements, such as the cavity mirrors, aperture, and the like is critical in the conventional laser resonator. A large mode diameter is generally desirable to achieve efficient extraction of laser energy using conventional plane or curved mirror laser resonators. This could be achieved only at the expense of even more stringent optical quality, alignment and lasing medium uniformity.

Another approach for producing a large mode diameter while providing better peformance involves the use of a spatial filter. This requires placing two lenses and a pinhole aperture within the laser cavity in the beam path. However, the disadvantages of this approach include additional elements which must be aligned, the same great sensitivity to optical aberrations of the medium or the optical elements, and the resultant loss of power upon the aperture. An additional difficulty is that high power operation is precluded by laser-induced breakdown at the aperture due to the presence of a tightly focused beam and high power density. This spatial filter approach has been largely abandoned in favor of unstable resonator designs.

Two prior techniques for minimizing alignment sensitivity involve the use of retroreflectors. Retroreflectors possess the property of reflecting a ray of light with an angular direction identical to the incident angle. The first uses a corner cube to eliminate the necessity of precise angular alignment of the primary reflecting element of the cavity (contrasted with the output element). The second uses a "cat's-eye" reflector, which is a lens and plane mirror combination, with the mirror located at the focal plane of the lens. The corner cube suffers the disadvantage of phase and polarization inversions about its three-fold axis of symmetry. The cat's-eye suffers from a power limitation, since it has a reflector located at the lens focus.

Prior attempts to correct unavoidable aberrations of the medium or optics have utilized a correction device external to the laser cavity. Two examples are the mechanically deformable mirror described in U.S. Pat. No. 3,731,103, and the technique of U.S. Pat. No. 4,005,935.

More recently, several attempts have succeeded in correcting phase front distortions in a laser cavity by using the mechanically deformable mirror inside a laser cavity. This technique is described in "Experimental Studies of Adaptive Laser Resonator Techniques", R. R. Stevens and R. C. Lind, with anticipated publication in Optics Letters, and "Adaptive Laser Resonator", R. H. Freeman, et al, Opt. Lett., Vol. 2, No. 3, March. 1978.

Drawbacks of this type of system include slow response times, need for external beam sampling to provide a feedback loop for the mechanical mirror servo system, and general system complexity resulting in high system cost and lower reliability.

Accordingly, it is an object of the present invention to provide an improved laser which corrects for aberrations in the laser wavefronts.

It is another object of the present invention to provide an improved laser in which the laser operates at or near its diffraction limit, that is, with optimum focusing capability.

SUMMARY OF THE INVENTION

In accordance with these and other objects of the invention, a nonlinear phase conjugate reflecting means is employed as one of the reflecting surfaces in a laser resonator. Additionally, there is provided a means to control the phase conjugating process, namely, an aperture stop, which acts as a reference plane for the phase conjugation process. The aperture stop is chosen or selected to allow only the fundamental mode to exit through it. Since all the light that exists at the aperture is of the fundamental mode, maximum power output is achieved.

The nonlinear phase conjugate reflecting means corrects for distortions in the wavefronts of the laser beam by reflecting the complex phase conjugate image of the distorted incident optical wavefront. When the reflected wave encounters the abnormality which initially caused the distortion, because it is the phase conjugate image of the distorted wave, it interacts with the abnormalities to form a plane wave.

In accordance with the present invention, four different embodiments of a nonlinear phase conjugate reflection means are disclosed. The first embodiment of the invention employs a stimulated Brillouin scattering device, or SBS device, as the nonlinear phase conjugate reflecting means.

In the stimulated Brillouin scattering (SBS) embodiment, an incident wavefront, which is deformed by an abnormality, impinges upon the SBS device and sets up acoustic waves in the SBS medium. The acoustic waves are generated by electrostriction, wherein there is an interaction of high intensity electric fields of the laser energy with the SBS medium. The electrostriction process periodically modulates the density of the SBS medium, setting up acoustic waves in response to the electric field impulses. The process is extremely fast compared to the distortions caused by any abnormality, turbulence, lens deformation, or the like. The acoustic waves that are set up in the SBS medium conform identically to the incident optical wavefronts, and act as reflecting surfaces for the optical wavefronts which impinge upon these acoustic waves. Therefore, the complex phase conjugate image of the incident optical wavefront is reflected, and when the wave encounters the abnormality which initially caused the deformation, the distorted wave is corrected as it passes the abnormality, and forms a plane wave.

The second embodiment utilizes the process of four-wave mixing to accomplish the wavefront correction. Two pump waves, emitted by either two external lasers of identical frequency or one laser and beamsplitting optics, produce coherent optical beams which are incident upon a nonlinear medium from opposite directions. A phase hologram is set up in the medium by the interaction of the two pump waves and an aberrated wavefront with the medium. The aberrated wavefront incident upon the pumped medium is reflected as a phase conjugate waveform. Alternatively, use of an appropriate absorbing or amplifying medium allows for amplituide holograms to be set up in the medium which results in the phase conjugation process.

The third embodiment utilizes the process of three-wave mixing, commonly known as parametric downconversion. Herein, the aberrated wavefronts are incident upon a nonlinear medium. Additionally, an external laser emits a pump having twice the frequency component of the aberrated waves which is also made incident upon the medium from the same direction. The interaction of the waves and the medium produce the phase conjugate waveform to be transmitted by the nonlinear medium. This waveform is then transmitted back along the incident optical path of the initial aberrated wavefront by conventional means.

The fourth embodiment utilizes the process of photon echoes to produce phase conjugate reflected images. This process is similar to that of the SBS process, but the nonlinear medium is different. In the photon echo proces, an aberrated waveform incident upon the nonlinear medium deforms the medium. A laser pulse emitted by an external laser subsequently incident upon this deformed medium is reflected as the complex phase conjugate waveform of the incident aberrated waveform. The process herein is very fast as compared to that of the SBS process. The process takes place within several centimeters of the input surface of the nonlinear system.

BRIEF DESCRIPTION OF THE DRAWINGS

The invention, including its various objects, features and advantages, may be more readily understood with reference to the following detailed description of several embodiments, taken in conjunction with the accompanying drawings, wherein like reference numerals designate like structural elements, and in which.

DETAILED DESCRIPTION OF THE INVENTION

Figure 1:
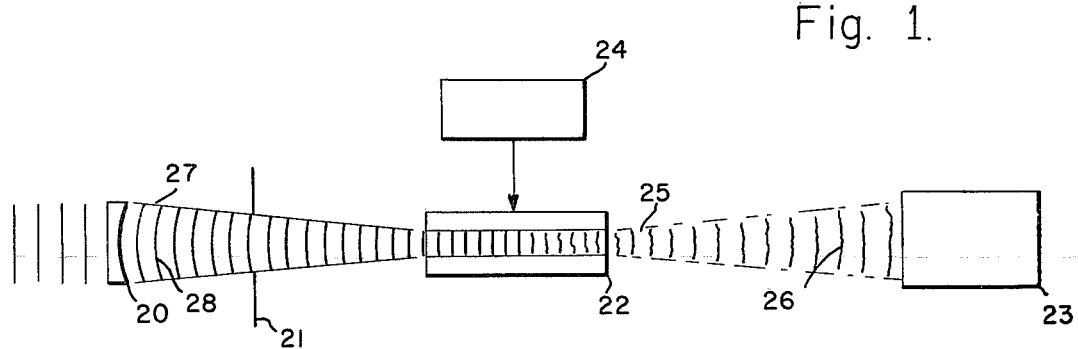
FIGS. 1 and 4 are diagrams of embodiments of an improved laser constructed in accordance with the present invention.

Referring now to FIG. 1 of the drawings, there is shown an embodiment of an improved laser constructed in accordance with the present invention. It includes an output element 20, a nonlinear phase conjugate reflecting means 23, and a lasing medium 22 disposed between the output element 20 and the nonlinear reflecting means 23, and situated along an optical axis through the approximate optical centers of these components. A support structure (not shown), is provided to position and mount the components of the laser.

The laser may employ any conventional lasing medium 22. It may employ a crystal, such as ruby, or the like; a gas, such as carbon dioxide, or the like; or a dye, such as Rhodamine 6G, or the like. The lasing medium 22 is excited by means of a pump or excitation means 24 of any conventional type, such as Xenon flashlamp, high energy electron beam, high voltage electric discharge, or the like.

The output element 20 is partially reflective and partially transmissive with respect to laser energy of the particular frequency emitted by the lasing medium 22. The output element 20 is depicted as a generalized output element. Clearly, there are alternative ways of providing output from a laser device which are known to those skilled in the art and we do not wish to be limited to the output element 20 herein described. An aperture stop 21 is disposed along the optical axis near the output element 20, and allows only the fundamental mode to exit the laser through the partially transmissive output element 20. The opening in the aperture stop 21 is sized to allow only the fundamental mode to pass through. The energy exiting the laser through the partially transmissive output element 20 is the output laser beam.

In accordance with the present invention, the non-linear phase conjugate reflecting means 23 is selected to be of the type which reflects the complex phase conjugate image of the incident optical wavefront, instead of a conventional plane mirror reflector or the deformable mirror system mentioned above. It is to be understood that the nonlinear phase conjugating reflecting means 23 is to be distinguished from the plane mirror or deformable mirror reflectors, or the like. The nonlinear reflecting means 23 refers to a particular type of material which has unique optical properties. In the deformable mirror system the mirror breaks up an incident laser beam into separate beams. The system deals with each separate beam individually and by means of a servo system tries to sum the individual phase contributions of each of the separate beams to get an optimumally phased beam on target. With the nonlinear reflecting means 23 the whole beam is processed simultaneously and almost instantaneously without servo systems or additional mechanical means. The nonlinear phase conjugate reflecting means 23 may take on several forms. In the embodiment of the improved laser shown in FIG. 1, the second reflecting means 23 is a stimulated Brillouin scattering device, hereinafter referred to as an SBS device.

Although all the properties of the SBS device are not known at the present time, the properties utilized in the present invention are well known, and are discussed in numerous patents and publications. These include, for reference, U.S. Pat. No. 4,005,935, "Method and Apparatus for Providing a Phase Compensated Optical Beam", Wang, (Feb. 1, 1977); "Connection Between Wave Fronts of the Reflected and Excited Light in Stimulated Mandel' Shatm-Brillouin Scattering", Zeldovich et al, ZhETF Pis. Red. 15 No. 3, 160-164 (5 Feb. 1972); and "Cancellation of Phase Distortion in the Amplifying Medium with a Brillouin Mirror", Nosach et al, ZhETF Pis. Red. 16 No. 11, 617-621 (5 Dec. 1972).

Figure 2:
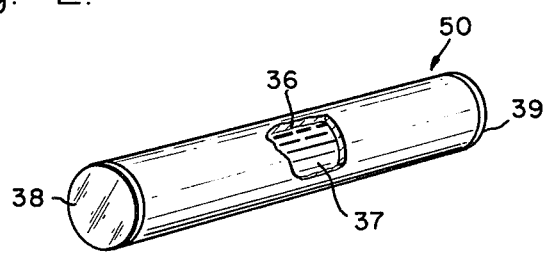
FIGS. 2a and 2b show waveforms typical of plane mirror reflecting surfaces.

Referring to FIG. 2, generally speaking, an SBS device is a thin-walled tube 36 or waveguide, which may be made of glass and filled with a nonlinear medium 37, such as carbon disulfide, or the like. The tube 36 may vary in length from several inches to several feet, with its cross-section being on the order of one-eighth inch to several inches in diameter. The guiding property is assured when the index of the medium is higher than that of the waveguide walls. Optical windows 38, 39 such as Brewster angle windows, or the like, are affixed to the ends of the tube 36 to allow for transmission of the laser beam.

The SBS device configuration (tube 36, windows 38, 39 and medium 37) will hereinafter be utilized in representing a generalized nonlinear medium and will be designated as nonlinear device 50, although other media could be used in its place and are referred to in the description.

The SBS device operates in such a manner as to reflect the complex phase conjugate waveform of the incident waveform. Acoustic waves are set up in the nonlinear device 50 through the process of electrostriction. The impinging light energy is reflected from these acoustic waves so as to be the complex phase conjugate waveform of the incident energy.

In operation, the improved laser of FIG. 1 corrects for distortions and associated problems in the laser energy wavefronts caused by imperfections in the output element 20, vibration of the output element 20, aperture stop 21 or nonlinear reflecting means 23, misalignment of the output element 20 or nonlinear reflecting means 23, temperature-varying phenomena due to component heating, aberrations in the lasing medium 22, turbulence in the lasing medium 22, or the like. These problems normally lower system efficiency and keep the system from performing at its diffraction limit (i.e., optimum focusing capability), but are alleviated in the improved laser system of the present invention.

Figure 3:
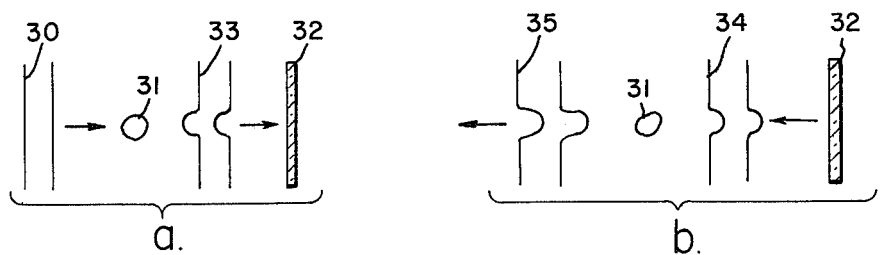
FIGS. 3a and 3b show waveforms indicative of phase conjugate reflecting means, and stimulated Brillouin scattering (SBS) in particular.

Referring to FIG. 3a, there is shown an incident wave 30 impinging upon an abnormality 31 in a conventional prior art laser having only a plane mirror 32. The abnormality 31 in the laser medium causes the incident waveshape 30 of FIG. 3a to arrive at the plane mirror 32 with the deformed shape depicted by waveshape 33. The reflected wave 34 (FIG. 3b), when encountering the abnormality 31, is further deformed, as shown by wave 35.

Figure 4:
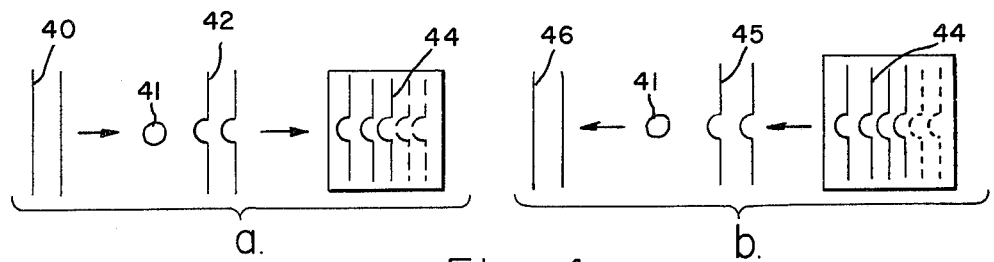

Referring now to FIG. 4, the improvement provided by the laser of the present invention is shown. An incident wavefront 40 is deformed by an abnormality 41 in the optical path. A distorted wavefront 42 impinges upon the SBS device and sets up acoustic waves 44 in the SBS medium. The acoustic waves 44 are generated by the process of electrostriction, involving interaction between the high intensity electric fields of the laser energy and the SBS medium. The electrostriction process periodically modulates the density of the SBS medium, setting up acoustic waves in response to the electric field impulses.

This process requires sufficient optical energy, as produced by a laser, due to the existence of a power threshold for the stimulated condition in the SBS device. Furthermore, the acoustic waves are generated in a time on the order of nanoseconds. Thus, the process is extremely fast compared to the distortions caused by the abnormality, turbulence, lens deformation, or the like. Within the SBS device, the acoustic waves 44 that are set up in the SBS medium conform identically to the incident optical wavefronts 42 and act as reflecting surfaces for the optical wavefronts 42 which impinge upon these acoustic waves 44.

Therefore, the complex phase conjugate image 45 (FIG. 3b) of the incident optical wavefront (FIG. 3a) is reflected, and when the wave 45 encounters the abnormality 41 which initially caused the deformation, the distorted wave 45 is corrected as it passes the abnormality 41 and forms a plane wave 46, as depicted in FIG. 4b.

Additionally, a frequency shift, or doppler shift, due to the receding acoustic waves in the SBS medium is added to the reflected phase conjugate energy. This shift is usually very small being on the order of 1 part in $10^5$, and does not affect performance.

In mathematical terms, an incident wavefront of the form $E(\vec{r})e^{i(\omega t - kz + \phi(r))}$ travelling from left to right along an arbitrary z direction, when reflected from an SBS device is of the form $\eta E^*(\vec{r})e^{i((\omega - \delta)t + kz - \phi(r))}$ wherein $\eta$ is a constant indicative of the amount of power reflected compared with that incident (in SBS $\eta < 1$); the $\omega t$ term is indicative of the incident phase at any point in time while the $(\omega - \delta)t$ term indicates that a frequency shift has occurredp; the $-kz$ term indicates a wave travelling to the right at a particular phase velocity and the $+kz$ term indicates the wave is travelling to the left; the $\phi(r)$ term is an arbitrary phase aberration term.

Referring again to FIG. 1 distorted wavefronts 26 and higher order modes, represented by wavy lines 26, impinge upon and are reflected by the nonlinear reflecting means 23 (which in this embodiment is the SBS device). Complex conjugate waveforms are reflected towards the output element 20.

However, this process is controlled so that a useful, coherent output beam is obtained. Left unrestricted and uncontrolled, use of the SBS device would continually reflect aberrated waveforms back and forth through the system.

This process is controlled by the aperture stop 21 which is positioned so as to restrict the laser output beam to the fundamental mode. The aperture stop 21 provides essentially a reference for the phase conjugation process. Aberrated waveforms to the right of the aperture stop 21 impinge upon it and thus are not reflected. These waveforms thus do not exit the laser. The fundamental mode is depicted by the smooth curve 27 with wavefronts 28 to the left of the aperture stop 21.

Figure 5:
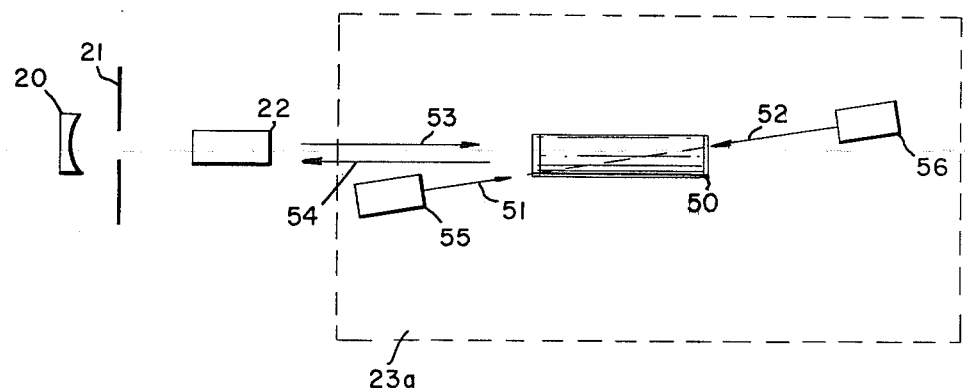
FIG. 5 shows a laser system implementing the four-wave mixing process.

A second embodiment of the present invention utilizes as the nonlinear reflecting means 23 apparatus which provides four-wave mixing, illustrated in FIG. 5. Two pump waves 51, 52, travelling in opposite directions, provided by two external lasers 55, 56 are incident upon a nonlinear device 50 containing a medium such as carbon disulfide. To increase the interaction length, the area in which phase conjugation takes place, pump waves from the two lasers 51, 52 are injected by use of beamsplitters, or the like, into the nonlinear medium along a line collinear with the aberrated wave or at a slight angle (~1°). The latter situation is depicted in FIG. 5.

A phase hologram is set up in the device 50 by the interaction of the pump waves 51, 52 and an aberrated wave 53 with the device 50. Alternatively, use of an appropriate absorbing or amplifying medium, such as ruby or sulfahexafluoride ($SF_6$), or the like, results in an amplitude hologram being set up in the medium (phrase conjugate waveforms can also be reflected from the amplitude holograms). An aberrated wavefront 53 incident upon the pumped device 50 from the laser medium 22 or the like, is reflected as the phase conjugate waveform 54 due to the presence of the second pump wave 52.

Four-wave mixing does not require the use of two lasers 55, 56. Four-wave mixing is still accomplished if the first pump wave 51 from laser 55 is split off by a beamsplitter, or the like, and made incident upon the nonlinear device 50 from the same direction as was the pump wave 52.

The mathematical equations are basically the same for this case as it is for the SBS situation. The incident wave is of the form $E(\vec{r})e^{i(\omega t - kz + \phi(r))}$ and the phase conjugate reflected wave is of the form $\eta E^*(-\vec{r})e^{i(\omega t + kz + \phi(r))}$, where $\eta$ can be greater than 1 ($\eta > 1$) due to the presence of the second pump wave 52. This indicates that in four-wave mixing there is a capability of providing gain to the reflected phase-corrected wavefront.

This process is discussed in detail in a number of articles and papers, including "Amplified Reflection, Phase Cojugation, and Oscillation in Degenerate Four-Wave Mixing", Yariv, Opt. Lett., Vol. 1, pg. 16, July 1977, and "Generation of Time Reversed Wave Fronts by Nonlinear Refraction", R. W. Hellwarth, J. Opt. Soc. Am., Vol. 67, No. 1, Jan. 1977.

Figure 6:
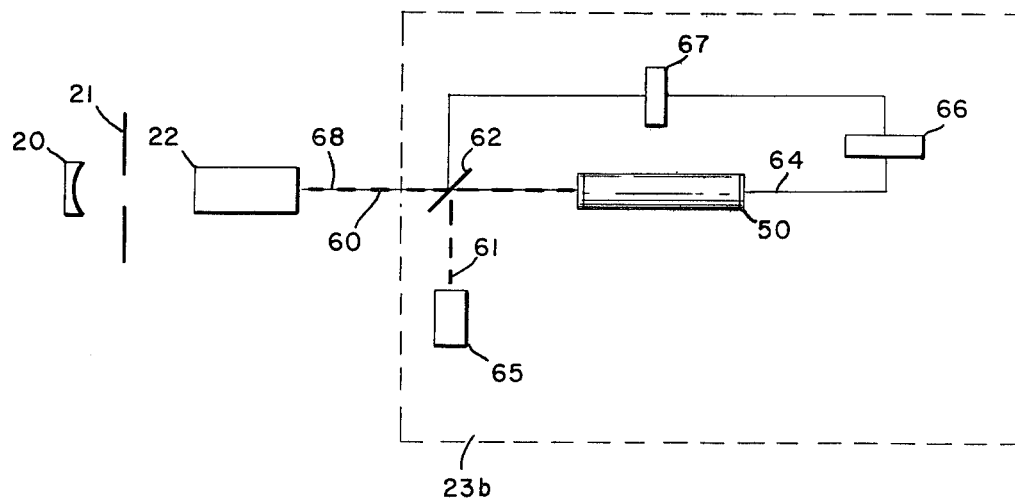
FIG. 6 shows a laser system implementing the three-wave mixing process.

A third embodiment of the present invention utilizes apparatus providing three-wave mixing, or parametric down conversion, as the nonlinear reflecting means 23. This process is illustrated in FIG. 6. An aberrated source wave 60, from the laser medium 22, or the like, is incident upon a nonlinear device 50 containing a medium such as a birefringent crystal, or the like. A beamsplitter 62 is disposed in the optical path so as to transmit part of the source wave 60 and reflect into the same optical path, a pump wave 61 from an external laser 65. The birefringent crystal has "fast" and "slow" optic axes relative to the phase of the incoming signals. The crystal is rotated relative to the phase of both the aberrated wave 60 and pump wave 61 so as to be at the phase matching angle with respect to the two waves 60, 61.

The pump wave 61 is chosen so as to have a frequency component which is twice that of the source wave 60. Interaction of the pump wave 61, source wave 60, and nonlinear device 50, results in an output wave 64 which is proportional to the product of the pump wave 61 and the complex phase conjugate of the source wave 60. This wave 64 is then reflected by conventional means back along the incident optical path, but in the reverse direction. In order that only the phase conjugate waveform 68 is transmitted back through the lasing medium 22 it is necessary to insert an optical filter 66, such as a multilayer interference filter, or the like, and a polarizer 67 into the optical path. These components 66, 67 filter out the pump wave 61 components and the incident transmitted beam 64, allowing the complex phase conjugate waveform 68 to pass back through the laser cavity.

In mathematical terms, a source wave 60 of the form $E_s e^{i\omega t}$ and a pump wave 61 of the form $E_p e^{2i\omega t}$ being incident upon a nonlinear medium 63 results in a transmitted wave of the form $\eta E_p E_s^* e^{i\omega t}$, where $\eta \gtrsim 1$ depending upon the strength of the pump wave 61 and $E_s^*$ represents the complex conjugate of the incident wave $E_s$.

Figure 7:
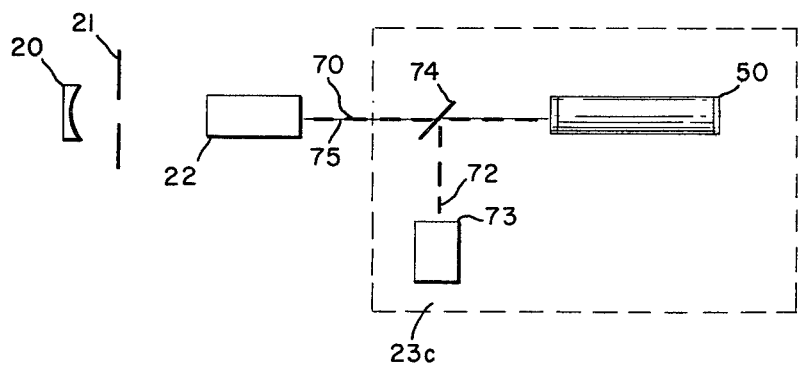
FIG. 7 shows a larger system implementing the photon echo process.

A fourth embodiment of the present invention utilizes a photon echo device as the nonlinear reflecting means 23 and is illustrated in FIG. 7. The phonton echo device is substantially the same as the SBS device as depicted in FIG. 2, but with a different nonlinear medium. However, the photon echo embodiment is not limited to the configuration of FIG. 7. The photon echo embodiment may also employ the mixing process utilizing two external lasers as shown in FIG. 5. Typical media include $SF_6$, $SiF_4$, $BCl_3$, $DH_3F$, and $I_2$ vapor, or the like. The nonlinear medium is housed in a tube or waveguide such as glass, or the like, as in the SBS embodiment and positioned to receive the light energy from the lasing medium 22 of FIG. 1.

Endcaps are affixed to the ends of the tube as in FIG. 2, both of which may be transmissive or one of which may be totally reflecting, depending upon the configuration used. If both endcaps are transmissive and one external laser is used, then conventional means, such as mirrors may be employed to direct the conjugated beam back through the laser cavity. If both endcaps are transmissive and two lasers are used as in FIG. 5, then the laser emitting pulses to the left (such as laser 56 in FIG. 5, for example) automatically provides a conjugated beam travelling in the require direction; namely to the left with reference to the drawings. If one laser is used, and a totally reflecting mirror is positioned at the correct end of the tube enclosing the medium; namely the right hand end with reference to FIG. 7, then the conjugated beam is reflected in the correct direction (to the left).

An aberrated light pulse 70 impinging upon the photon echo medium deforms the medium. A laser pulse 72 is reflected into the optical path by a beamsplitter 74, or the like, which subsequently impinges upon the deformed medium. This pulse 72 is reflected from the medium as the phase conjugate 75 of the aberrated waveform. This phase conjugate waveform is corrected as it travels back through the lasing medium 22 to produce a corrected wavefront at the opposite end of the laser.

The interacting waves are all present at the same time in the medium. The aberrated wave to be conjugated and the pump wave, or waves, may also be applied at separate times, and the conjugate wave may be radiated with some delay in the backward or forward direction. This permits storage of pulses, if desired, as well as phase correction by conjugation.

The photon echo device employed in the present invention is known in the art and is described in a paper by C. V. Heer and P. F. McManamon, "Wavefront Correction with Photon Echos", Optics Communications, Vol. 23, No. 1, Oct. 1977; Yariv, Quantum Electronics, 2d Edition, 1975, § 15.3 and in a paper submitted for publication in Optics Letters by A. Yariv and J. AuYeung, Transient Four-Wave Mixing and Real Time Holography in a Two-Level Atomic System.

Thus, there has been described an improved laser which self-corrects for distortions created by aberrations and time-varying phenomena internal to the laser.

It is to be understood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What is claimed is:

1. A laser, comprising:
    a nonlinear phase conjugate reflecting means for providing light which is the phase conjugate of light incident thereupon;
    partially transmissive reflecting means for transmitting a portion and reflecting a portion of the light incident thereupon;
    a lasing medium disposed between said partially transmissive reflecting means and said nonlinear phase conjugate reflecting means, the combination thereof forming a laser resonator;
    excitation means coupled to said lasing medium for exciting said laser medium and inducing laser operation; and
    an aperture stop configured and disposed within said laser resonator adjacent to said partially transmissive reflecting means so as to create a reference for the phase conjugating process and restrict laser operation to a single lasing mode irrespective of phase aberrations within said laser resonator.

2. The laser of claim 1, wherein said nonlinear phase conjugate reflecting means is a stimulated Brillouin scattering device which comprises a nonlinear medium capable of undergoing stimulated Brillouin scattering and providing said phase conjugate light.

3. The laser of claim 1, wherein said nonlinear phase conjugate reflecting means is a four-wave mixing device which comprises a nonlinear medium and at least one laser which provides pump beams impinging upon said nonlinear medium from substantially opposite directions, and wherein the interaction between said pump beams, said nonlinear medium and light provided by said laser resonator provides said phase conjugate light.

4. The laser of claim 1, wherein said nonlinear phase conjugate reflecting means is a three-wave mixing device which comprises a nonlinear medium and a laser which provides a pump beam at twice the frequency of said laser resonator which impinges upon said nonlinear medium, and wherein the interaction between said pump beam, said nonlinear medium and light provided by said laser resonator provides said phase conjugate light.

5. The laser of claim 1, wherein said nonlinear phase conjugate reflecting means is a photon echo device which comprises a nonlinear medium and a laser which provides a pump beam which impinges upon said nonlinear medium, and wherein the interaction between said pump beam, said nonlinear medium and light provided by said laser resonator provides said phase conjugate light.

6. A laser which self-corrects for distorted wavefronts therewithin in its energy beam, said laser comprising:
    a lasing medium;
    partially transmissive reflecting means for transmitting a portion and reflecting a portion of the light incident thereupon;
    phase conjugate reflecting means, including a nonlinear medium capable of undergoing stimulated Brillouin scattering, for providing phase conjugate light in response to light incident thereupon, said phase conjugate reflecting means and said partially transmissive reflecting means being disposed at opposite ends of said lasing medium so as to form a laser resonator;
    excitation means coupled to said lasing medium for exciting said lasing medium and inducing laser operation; and
    an aperture stop configured and disposed in said laser resonator adjacent to said partially transmissive reflecting means for creating a reference for the phase conjugating process and for restricting said laser operation to a single transverse lasing mode;
    wherein distorted wavefronts of the beam of said laser resonator impinge upon said nonlinear medium and produce acoustic waves therein by the process of electrostriction, from which are generated reflected phase conjugate wavefronts of said distorted wavefronts which transverse back through said lasing medium and exit said resonator through said partially transmissive reflecting means as a substantially diffraction-limited beam.

7. A laser which self-corrects for distorted wavefronts therewithin in its energy beam, said laser comprising:
    a lasing medium;
    partially transmissive reflecting means for transmitting a portion and reflecting a portion of the light incident thereupon;
    phase conjugate reflecting means for providing phase conjugate light in response to light incident thereupon, said phase conjugate reflecting means providing four-wave mixing means including a nonlinear medium and at least one laser which provides light to said nonlinear medium from substantially opposite directions, said phase conjugate reflecting means and said partially transmissive reflecting means being disposed at opposite ends of said lasing medium so as to form a laser resonator;
    excitation means coupled to said lasing medium for exciting said lasing medium and inducing laser operation; and
    an aperture stop configured and disposed in said laser resonator adjacent to said partially transmissive reflecting means for creating a reference for the phase conjugation process and for restricting said laser operation to a single transverse lasing mode;
    whereby distorted wavefronts of the beam of said laser resonator impinge upon said nonlinear medium, and interaction between said distorted wavefronts, light provided by said at least one laser and said nonlinear medium provides for said phase conjugate light reflected therefrom, which transverses back through said lasing medium and exits said laser resonator through said partially transmissive reflecting means as a substantially diffraction-limited beam.

8. A laser which self-corrects for distorted wavefronts therewithin in its energy beam, said laser comprising:

a lasing medium;

partially transmissive reflecting means for transmitting a portion and reflecting a portion of the light incident thereupon;

phase conjugate reflecting means for providing phase conjugate light in response to light incident thereupon, said phase conjugate reflecting means and said partially transmissive reflecting means being disposed at opposite ends of said lasing medium so as to form a laser resonator having an energy beam, said phase conjugate reflecting means providing three-wave mixing means including a nonlinear medium and a laser which provides light to said nonlinear medium at a frequency twice that of said laser resonator;

excitation means coupled to said lasing medium for exciting said lasing medium and inducing laser operation; and an aperture stop configured and disposed in said laser resonator adjacent to said partially transmissive reflecting means for creating a reference for the phase conjugation process and for restricting said laser operation to a single transverse lasing mode;

wherein distorted wavefronts of the beam of said laser resonator impinge upon said nonlinear medium, and interaction between said distorted wavefronts, light from said laser and said nonlinear medium provides for said phase conjugate light reflected therefrom, which transverses back through said lasing medium and exits said laser resonator through said partially transmissive reflecting means as a substantially diffraction-limited beam.

9. A laser which self-corrects for distorted wavefronts therewithin in its energy beam, said laser comprising:

a lasing medium;

partially transmissive reflecting means for transmitting a portion and reflecting a portion of the light incident thereupon;

phase conjugate reflecting means providing photon echo means, including a nonlinear medium and a laser, for providing phase conjugate light in response to light incident thereupon, said phase conjugate reflecting means and said partially transmissive reflecting means being disposed at opposite ends of said lasing medium so as to form a laser resonator;

excitation means coupled to said lasing medium for exciting said lasing medium and inducing laser operation; and an aperture stop configured and disposed in said laser resonator adjacent to said partially transmissive reflecting means for creating a reference for the phase conjugating process and for restricting said laser operation to a single transverse lasing mode;

wherein distorted wavefronts of the beam of said laser resonator impinge upon said nonlinear medium, and interaction between said distorted wavefronts, light provided by said laser and said nonlinear medium provides for said phase conjugate light reflected therefrom, which traverses back through said lasing medium and exits said laser resonator through said partially transmissive reflecting means as a substantially diffraction-limited beam.

* * * * *

UNITED STATES PATENT AND TRADEMARK OFFICE
CERTIFICATE OF CORRECTION

PATENT NO. : 4,233,571

DATED : NOV. 11, 1980

INVENTOR(S) : VICTOR WANG; AMNON YARIV

It is certified that error appears in the above—identified patent and that said Letters Patent is hereby corrected as shown below:

IN THE BRIEF DESCRIPTION OF THE DRAWINGS:

Column 3, line 64, delete "FIGS. 1 and 4 are diagrams of embodiments of an improved laser constructed in accordance with the present invention;" and substitute therefor --FIG. 1 is a diagram of an embodiment of an improved laser constructed in accordance with the present invention;--

Column 3, line 67, delete "FIGS. 2a and 2b show waveforms typical of plane mirror reflecting surfaces;" and substitute therefor --FIG. 2 is a drawing of a non-linear device for use in the laser of FIG. 1;--

Column 4, line 1, delete "FIGS. 3a and 3b show waveforms indicative of phase conjugate reflecting means, and stimulated

UNITED STATES PATENT AND TRADEMARK OFFICE
CERTIFICATE OF CORRECTION

PATENT NO. : 4,233,571

DATED : NOV. 11, 1980

INVENTOR(S) : VICTOR WANG; AMNON YARIV

Page 2 of 2

It is certified that error appears in the above—identified patent and that said Letters Patent is hereby corrected as shown below:

Brillouin scattering (SBS) in particular;" and substitute therefor --FIGS. 3a and 3b show waveforms typical of plane mirror reflecting surfaces;--

Column 4, before FIG. 5 insert a new paragraph --FIGS. 4a and 4b show waveforms indicative of phase conjugate reflecting means, and stimulated Brillouin scattering (SBS) in particular.--

Signed and Sealed this

Ninth Day of June 1981

[SEAL]

Attest:

RENE D. TEGTMEYER

Attesting Officer

Acting Commissioner of Patents and Trademarks